Figure 1:
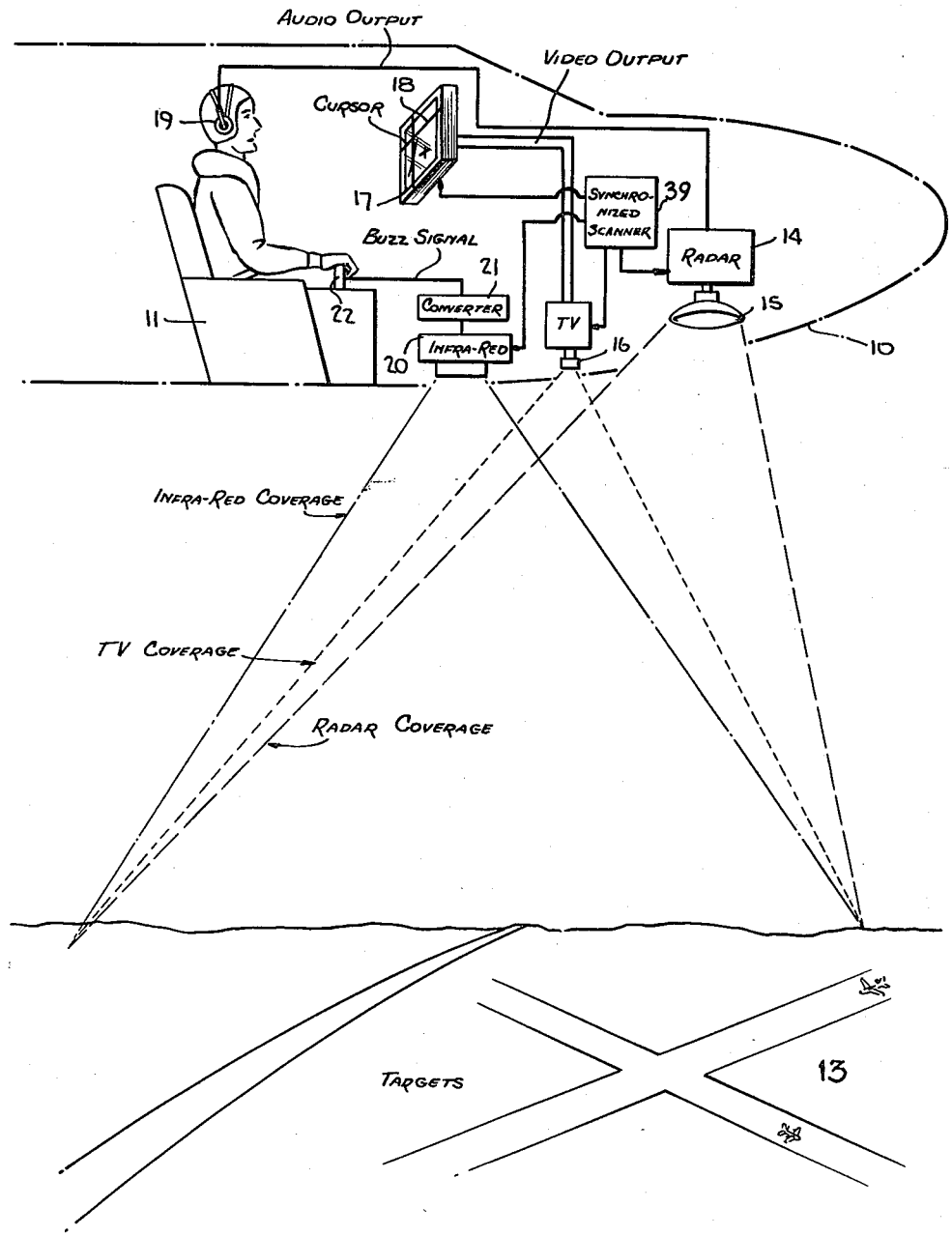

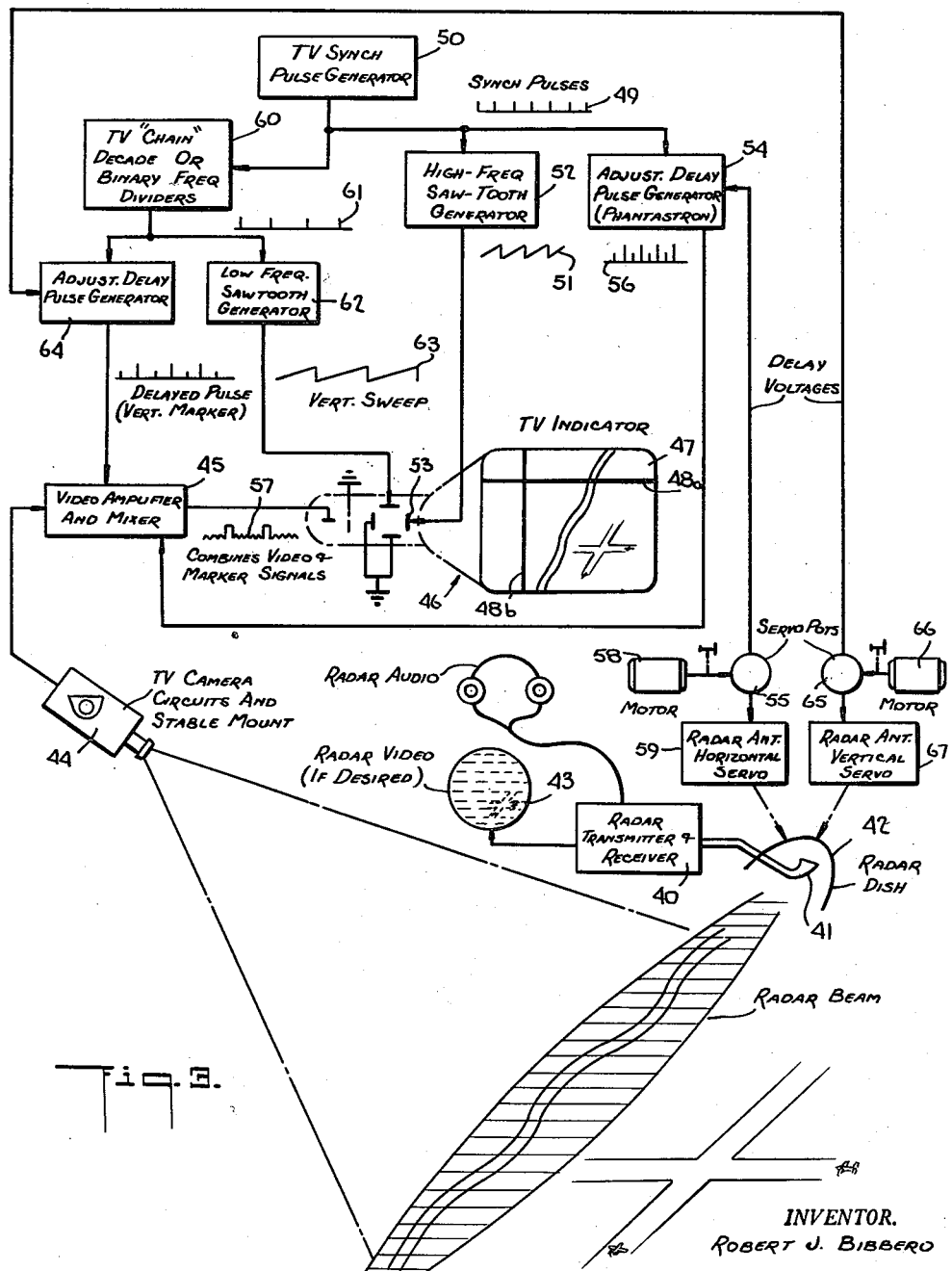

3,076,961
MULTIPLE-SENSOR COORDINATED APPARATUS
Robert J. Bibbero, Great Neck, N.Y., assignor to Bulova
Research and Development Laboratories, Inc., Woodside, Long Island, N.Y., a corporation of New York
Filed Oct. 27, 1959, Ser. No. 849,087
12 Claims. (Cl. 343—6)

The present invention relates generally to apparatus for coordinating information derived from two or more sensors, such as television, radar and infra-red devices. More particularly, the invention deals with a coordinated multiple-sensor airborne reconnaissance system for the ground detection and location of military and other objectives.

Conventional aerial reconnaissance cameras are incapable of detecting some military objectives which are obscured by the existence of natural growth on the terrain or by the use of camouflage techniques. Thus a reconnaissance camera will ordinarily not reveal the presence of enemy divisions which have been deployed in forest areas, nor will it locate camouflaged artillery, aerodromes, munition dumps and the like.

Radar reconnaissance techniques are known whereby radar pulses propagated toward the earth's surface are reflected by ground objects in varying degree, depending upon the specific nature of the object and its ground orientation, to provide radar indications. While attempts have been made to coordinate radar and photographic data, the results heretofore have not been of practical value, for the information obtained thereby could not be so coordinated as to provide indications in simple and convenient form. For example, it has been proposed to apply radar pulse indications along the frame edges of a photographic film, each pulse having a height indicative of the intensity of reflection received from an object lying within the related photographs. This side-by-side relationship of photographic and radar data is difficult to interpret and is of little value in quick search missions by reconnaissance aircraft.

The requirements of airborne military reconnaissance or surveillance of military and industrial objectives are now such that one observer is called upon to monitor more than one sensor. Such monitoring must be continuous, at least during certain critical periods which arise for example when flying over suspected target areas. It is essential that potential targets be detected immediately, even when passage thereover is at high speeds or at low altitudes. Existing techniques for combining sensor indications involve recording information on film and processing and projecting two or more presentations in the form of overlays. Also employed are threshholded or contoured treatments of combined visual displays. Such techniques entail the use of elaborate and bulky equipment. The sheer weight and size of such equipment constitute a serious drawback in airborne installations.

It is the primary object of my invention to combine two or more sensor presentations in a simple and more natural manner than has heretofore been the practice, the coordination being consonant with modern human engineering principles.

Also an object of the invention is to provide a sensor coordination method and apparatus therefor which utilizes less weighty and costly equipment for recording, processing, projection and electronic signal shaping.

To illustrate simply the principles underlying the invention, let us assume that it is desired to combine airborne television and radar sensors, each of which detects individual characteristics of the terrain and provides a distinct response to various metallic and non-metallic targets. The radar and television systems provide separate images of the terrain and the problem therefore is to coordinate these images so as to obtain optimum information.

In accordance with the invention, the radar data is converted into audio signals, this being accomplished by heterodyning methods or by rescanning the visual presentation at a slower rate. The radar information is then presented to the observer through a suitable loud speaker or headphone, while at the same time the visual information on the television screen is synchronized by means of a marker or cursor operating automatically to indicate the aural scan of the radar presentation. In this way, two senses of the observer are separately but simultaneously utilized to monitor the two sensors.

A target with a noticeable radar return which does not show up on the television screen, such as a camouflaged rocket launcher, will signify its presence by a distinctive sound. By the combined television display and marker, the observer's attention can be drawn to the visual characteristics and location of the target, or he can switch his attention to an auxiliary visual radar display.

The same basic principle may be extended to more than two sensors. For example, if it is desired to add a third sensor to the combined T-V and radar system described above, a third sense of the observer can be employed. The third sensor may take the form of an infrared or electromagnetic emission detection system to pickup targets which cannot be intercepted by light or radar detection, and the third sense could be the sense of touch. In this case, the output of the third sensor may be converted into an electric voltage detectable by the skin of the observer as a mild shock, or it may be converted to vibratory sensation, such as is produced by a buzzer. The output may if preferred be transformed into varying degrees of heat. Thus the observer has his attention directed via separate human sensory responses to particular target characteristics detected by respective sensors.

A brief period of training with a coordinated assembly of sensors will teach the observer to analyze and coordinate the various responses and to enable him to distinguish between meaningless signals or noise and meaningful target peculiarities.

Figure 2:
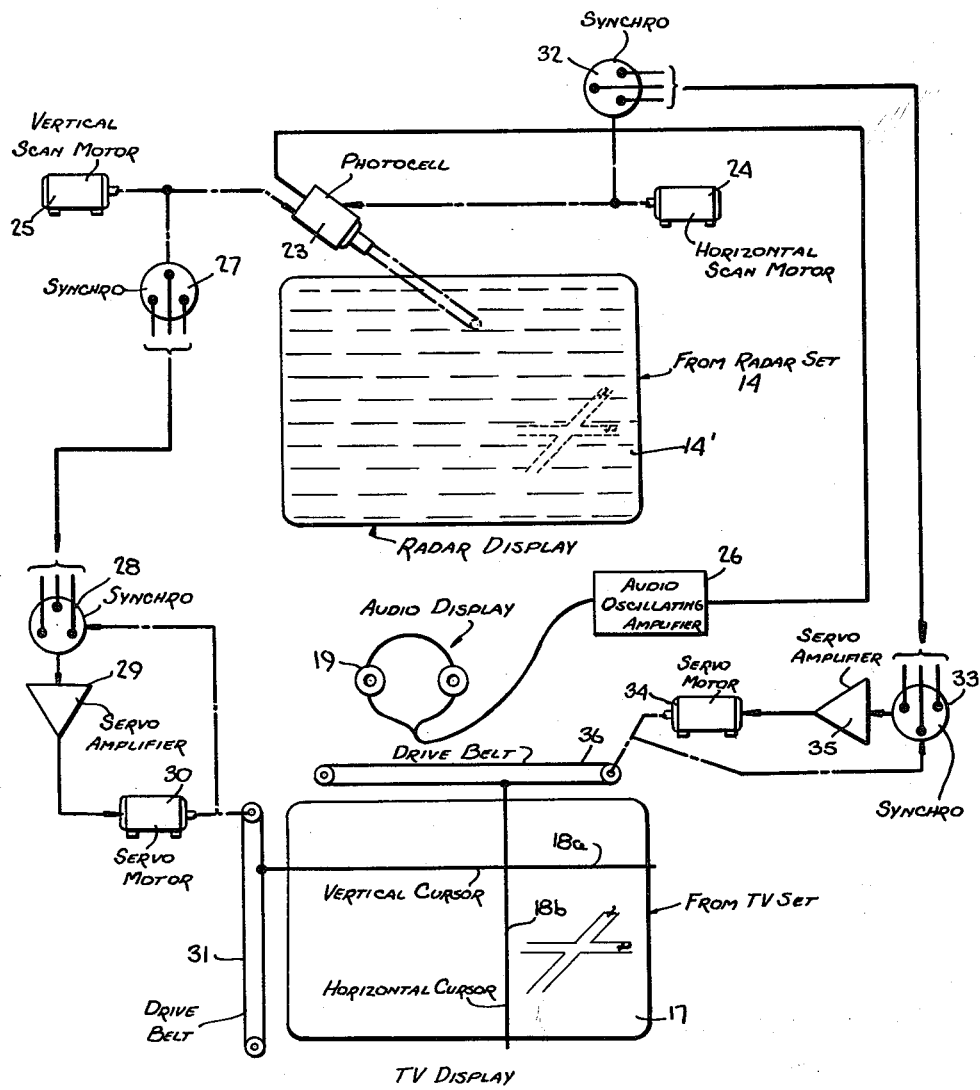

For a better understanding of the invention, as well as other objects and further features thereof, reference is made to the following detailed description to be read in conjunction with the accompanying drawing, wherein:

FIG. 1 is a schematic block diagram of one preferred embodiment of multiple-sensor system in accordance with the invention, FIG. 2 is a schematic diagram showing in greater detail certain of the features incorporated in the system of FIG. 1, FIG. 3 is a schematic diagram illustrating another preferred embodiment of the invention.

Referring now to the drawing, and more particularly to FIG. 1, a multiple-sensor assembly in accordance with the invention is installed in an aircraft 10 having an observation seat 11 which is to be occupied by an observer 12. To illustrate the operation of the assembly on the terrain to be observed below the plane there is disposed an airstrip 13. Mounted on the plane for viewing the terrain is a radar system 14, including an aerial 15 for projecting a radar scanning beam, a television system including a T-V camera 16 for viewing the same area, and an infra-red detecting system 20 also trained to cover the same area.

Thus three sensors are provided, the sensors being adapted concurrently to view substantially the same area, the response of each sensor depending of course on its inherent characteristics. Hence the T-V camera is able to pick-up only that which is illuminated and visible, the radar system, on the other hand, will observe objects on the basis of their reflectivity to high frequency energy, while the infra-red system will respond to infra-red rays emitted from the terrain and objects thereon.

By proper coordination of the three sensors, objects to which one is insensitive may be detected by the other sensors, thereby fully exploring the terrain and obviating the effects of camouflage, whether man-made or due to natural conditions.

The output of the T-V camera 16 is fed to a visual indicator 17 which takes the usual form of a cathode-ray tube having a fluorescent screen scanned by an electron beam to provide an illuminated picture of the area viewed by the camera. The observer 12 is seated before the screen and is able to see the ground covered by the T-V camera. He cannot of course see on the screen camouflaged objects or those lacking illumination, nor is he able to see whether the object is metallic or non-metallic.

The radar system 14, which may take the form of one whose presentation is of the so-called P-P-I type (plan position indication), provides an image of the same terrain, the objects thereon being presented in accordance with their degree of reflectivity to radar pulses. In accordance with the present invention, the visual image presented on the television screen 17 is analyzed in rectangular coordinates on the basis of information derived from the radar system 14, so that the observer may be made cognizant, by means of sensory responses other than sight, of objects not visible through the television system.

This is accomplished by the use of a cursor 18 which traverses the T-V screen 17 in synchronism by a scanning device 39 which scans the radar image on the radar screen, such that each scanned position on the radar screen is correspondingly indicated on the T-V screen. At the same time the radar responses are converted into sound signals which by their intensity or frequency or a combination of both factors indicate the nature of the radar response. The sound signal is applied to earphones 19 on the head of the observer.

For example, if the cursor occupies a point on the radar screen at which there is a highly reflective target, the sound produced at this point may be a high pitched tone of loud intensity and when the cursor shifts to a point at which there is nothing more than, say, a sandy area, the resultant audio signal may be a low frequency tone of low intensity. Consequently the observer, as the cursor travels across the T-V image, is made aurally aware of areas of interest.

Also provided is an infra-red detection system 20 which covers the same ground area, the output being converted in device 21 into a vibratory motion by means of a buzzer 22 or similar device which is felt by the hand of the observer. The greater the infra-red response, the higher the buzzer amplitude.

Referring now to FIG. 2, the operation of the cursor 18 will be explained in greater detail. The T-V screen 17 or any suitable optical projection screen portrays an area of ground being surveyed from the aircraft, while the radar screen 14' portrays the same area at the same time. In order usefully to coordinate the information presented on the two screens, the cursor 18 is provided with horizontal and vertical cross-hairs 18a and 18b, the intersection of the two hairs designating a particular area in terms of rectangular coordinates.

The radar display is scanned, not by the observer but by an optical system which permits only a very small patch on the screen to be observed at any time. This is effected by a photocell 23 which is so mounted as to scan back and forth across the entire field of the radar screen as well as up and down. For this purpose there is provided a horizontal scan motor 24 which causes the photocell to traverse the screen in the back and forth direction and a vertical scan motor 25 which moves the photocell up and down relative to the screen.

In operation, a line by line sequential scanning takes place of the entire field of the radar image. The output of the photocell is a voltage whose magnitude depends on the illumination of the radar image being viewed. Thus a target of high reflectivity will provide a brightly illuminated area on the screen and when the photocell is pointed at this area the resultant voltage will be of large amplitude.

The output of the photocell is applied to an audio oscillator and amplifier to provide a tone whose frequency and intensity depends on the applied input voltage. For example, the photocell voltage may act as a variable bias on a tone generator 26 whose output frequency is proportional to the input voltage level and the same bias may also be applied to an amplifier coupled to the generator to provide a volume level proportional thereto, the audio output being then fed to headphones 19.

The position of cursor 18 is caused to follow the scanning action of photocell 23, so that when a given sound is heard, the appropriate area on the T-V screen is identified. This is accomplished through a servo system including a synchro transmitter 27, mechanically coupled to the shaft of the vertical scan motor 25, the output of synchro 27 being fed to a synchro receiver 28 whose output is applied, through a servo amplifier 29, to a servo motor 30. Servo motor 30 operates a continuous belt 31 or other means for shifting the vertical cursor hair line 18a to a position corresponding to the vertical position of the photocell 23.

Similarly, horizontal follow-up is effected by a synchro transmitter 32 mechanically coupled to the horizontal scan motor 24, the output thereof being fed to a synchro receiver 33 which energizes the synchro motor 34 through amplifier 35, motor 34 driving a continuous belt 36 which shifts the cursor hair line 18b to effect horizontal correspondence between the photocell and this hair line.

Thus as the photocell scans back and forth and simultaneously from top to bottom under the control of the scanning motors geared to its mounting mechanism the entire radar display may be evenly scanned and at the same time the slaved horizontal and vertical cursors will move in synchronism across the T-V picture indicating the radar area being scanned. The light and dark portions of the radar image are converted to distinctive sounds so that sounds peculiar to certain types of targets can then be spatially located by the observer on the T-V screen by means of the cursor hair lines and its characteristics further examined.

It is to be understood that for the radar screen there may be substituted graphic indications or recording of the signals from an infra-red scanner, a sonic device or even a different type of radar, such as a Doppler of the moving target detector type, in which case the operator's attention will be directed exclusively to objects moving along the ground.

Referring now to FIG. 3, that is shown a multiple-sensor system wherein the instantaneous position of the ground patch being examined by a radar system is identified on a T-V screen by electronically generated cross hairs, rather than by a mechanically operated cursor as in FIGS. 1 and 2.

The radar system includes a radar transmitter and receiver 40, of standard design coupled to an antenna 41, placed within a reflector or dish 42 supported on a stable mount to project a radar "pencil beam" which is caused to scan the ground from the aircraft in a regular pattern. Produced on the radar screen 43 is a rectangular raster.

Scanning the same area is a T-V camera 44 placed on a stable mount, the output of the camera being applied through a video amplifier and mixer 45 to a cathode-ray tube 46 having a screen 47 on which is displayed the same view as appears on the radar screen. It will be seen that electronic cross-hairs 48a and 48b are produced on the video screen in the form of fluorescent traces, which hair lines are intended to serve the same function as the mechanical cursor in FIGS. 1 and 2.

A series of equally-spaced electrical pulses, as indicated graphically by form 49, is produced by a conventional sync pulse generator 50, as would normally be supplied by T-V camera synchronizing equipment. From these master pulses there are derived a series of saw-tooth sweep voltage 51 in a conventional high-frequency saw-tooth generator 52, the saw-tooth voltage being synchronized with the master pulses. The saw-tooth wave from generator 52 is applied to the horizontal deflection plates 53 of the cathode-ray tube 46 and also to the usual horizontal sweep circuit of the T-V camera 44.

The sync pulses from generator 50 are also applied to an adjustable delay pulse generator 54, which in practice may take the form of a phantastron. The amount of delay is determined by the voltage supplied from the arm of a potentiometer 55. The delayed pulses represented by marker pulses 56, after suitable amplification and shaping, are applied to the video amplifier and mixer 45, where they are mixed with the video signals from T-V camera 44 to produce a wave train 57 constituted by the combined marker pulses and video signal. These pulses are fed to the intensity modulation electrode (cathode) of the T-V tube 46. The polarity of the marker pulse is such that it causes a bright spot to appear on the T-V screen 47.

Since the brightened spot is delayed by a constant time from the start of the horizontal sweep produced by saw-tooth generator 52, it will also occur at a constant position along the horizontal sweep of the T-V tube. If the T-V sweep is moved vertically to form the usual type of raster, the locus of all brightened spots on the horizontal T-V scan will form the vertical line 48b.

The position of the vertical line 48b is determined by the voltage from potentiometer 55, driven by a motor 58 which also controls the radar antenna horizontal servo 59 (horizontal in the same sense as the orientation of the T-V system). Therefore, the instantaneous horizontal position of the radar beam and of the ground patch it illuminates corresponds to the horizontal position of the vertical marker line 48b of the T-V screen.

The horizontal marker line 48a is formed in essentially the same way. The frequency of the sync pulse generator 50 is divided by a chain of binary or decade counters 60, the resultant low frequency pulses 61 being applied to a low frequency saw-tooth generator 62 to generate a vertical saw-tooth sweep voltage 63. The low frequency pulses 61 are also applied to an adjustable delay pulse generator 64, the delay thereof being under the control of a voltage from the potentiometer 65 which determines the vertical radar antenna position, the potentiometer being driven by a motor 66 and being connected to the radar antenna vertical servo 67. The delayed low rate pulses 68 are applied to the video mixer 45 and are combined therein with the video signal and other marker pulses, thereby to form the line 48a (horizontal) representing the vertical coordinate of the radar ground patch.

The output of the radar system is converted to an audio signal and applied to earphones 19, as in the previous example, and, if desired, simultaneously to an auxiliary video scope. The audio output of the radar system is of course monitored by the operator along with the video output of the primary sensor (i.e. the T-V system).

It is to be understood that features of the two embodiments described herein may be combined in any desired manner. Thus the mechanical cross-hairs can be used in conjunction with a pencil scanning beam and the electronic cross-hairs with auxiliary scanning of a sensor with a coordinate display.

While there has been shown what at present are considered to be preferred embodiments of the invention, it is to be understood that many changes and modifications may be made therein without departing from the essential aspects of the invention as defined in the annexed claims.

What is claimed is:

1. A coordinated multiple-sensor system comprising first and second sensors each of which is adapted to detect individual characteristics of a common area and to present a separate visual image of said area, and apparatus to coordinate the first and second sensor images including means to analyze the first image to convert the image components thereof into corresponding non-visual sensory stimuli, and means operating synchronously with said analyzing means to scan the second sensor image to provide an indication thereon relating said non-visual stimuli representing said first image components with the relevant components of said second image.

2. A system as set forth in claim 1, wherein said non-visual stimuli are constituted by sound signals modulated in accordance with the image components.

3. A system as set forth in claim 1, wherein said non-visual stimuli are constituted by vibratory signals modulated in accordance with the image components.

4. A system as set forth in claim 1, wherein said non-visual stimuli are constituted by electric shocks which vary in accordance with the image components.

5. A system as set forth in claim 1, wherein said non-visual stimuli are constituted by heat whose energy level varies in accordance with the image components.

6. A coordinated multiple-sensor system comprising television and radar sensors each of which is adapted to detect individual characteristics of a common area and to present a separate visual image of said area, and apparatus to coordinate the television and radar sensor images including means to analyze the radar image to convert the image components thereof into corresponding audio stimuli, and means operating synchronously with said analyzing means to scan the television sensor image to provide an indication thereon relating said audio stimuli representing said radar image components with the relevant components in said television image.

7. A coordinated multiple-sensor system comprising television and radar sensors each of which is adapted to detect individual characteristics of a common terrain and to present a separate visual image of said terrain, and apparatus to coordinate the two sensor images including means to analyze the radar image to convert the image components thereof into corresponding audio stimuli, and marker means operating synchronously with said analyzing means to scan the television sensor image to provide an indication thereon relating said audio stimuli representing said television image components with the relevant components in said television image.

8. A system as set forth in claim 7, wherein the means to analyze the radar image is constituted by a photocell, means to cause said photocell sequentially to scan the field of the radar image to produce a varying output voltage and means to convert said varying voltage into a corresponding audio signal.

9. A system as set forth in claim 8, further including a servo system for synchronizing the scanning action of said marker means and said scanning photocell.

10. A coordinated multiple-sensor system comprising television and radar sensors each of which is adapted to detect individual characteristics of a common terrain and to present a separate visual image of said terrain, and apparatus to coordinate the two sensor images including photocell means to scan the radar image and to convert the image components thereof into corresponding audio stimuli, and cursor means to scan the television sensor image to provide an indication thereon relating said audio stimuli representing said radar image with the relevant components in said television sensor image, and means to synchronize the scanning actions of said photocell and cursor means.

11. A system as set forth in claim 10, wherein said television image is presented on a cathode ray tube screen and said cursor means is constituted by means for electronically producing intersecting lines on said screen.

12. A coordinated multiple-sensor system comprising television, radar and infra-red sensors each of which is adapted to detect individual characteristics of a common area and to present a separate visual image of said area, and apparatus to coordinate the three sensor images including means separately to analyze the radar and infra-red images to convert the image components thereof into two distinct corresponding non-visual stimuli, and means operating synchronously with said analyzing means to scan the television sensor image to provide an indication thereon relating said non-visual stimuli with the relevant components in said television image.

No references cited.